J. M. FLEMING.
ADJUSTABLE SEAT BACK FOR AUTOMOBILES.
APPLICATION FILED OCT. 26, 1912.
1,058,575.  Patented Apr. 8, 1913.
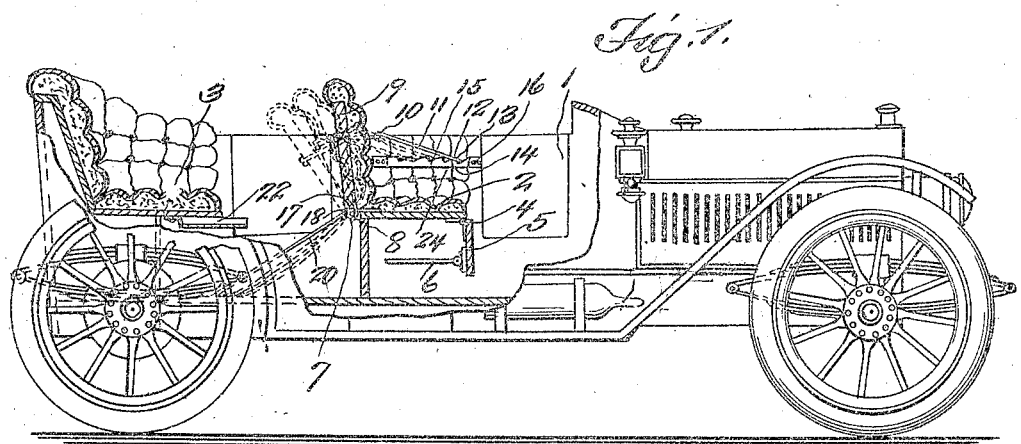
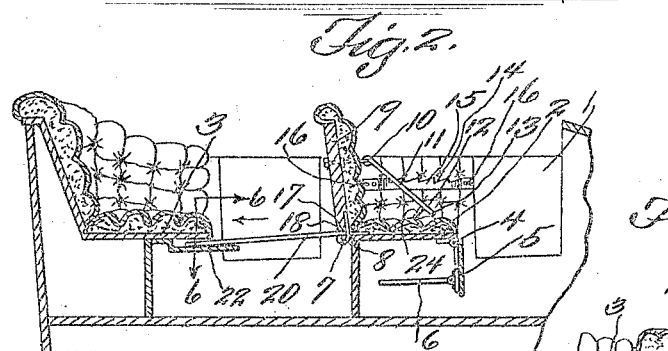
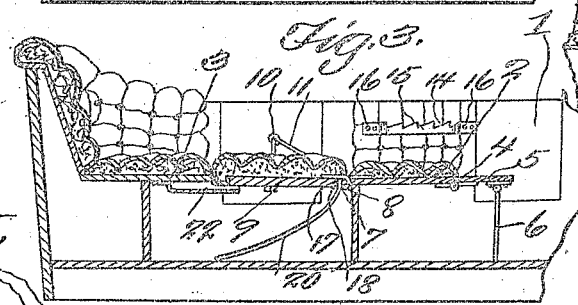
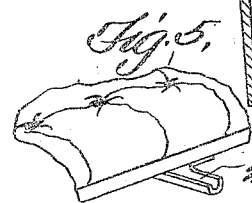
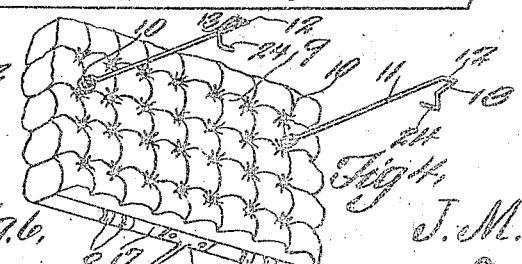
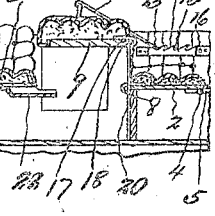
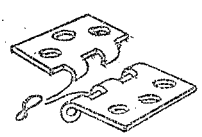
Witnesses
Robt Meyer
Francis T. Boswell
Inventor
J. M. Fleming,
By Schiffer & Co.
Attorneys

UNITED STATES PATENT OFFICE.

JAMES MONROE FLEMING, OF PENSACOLA, FLORIDA.

ADJUSTABLE SEAT-BACK FOR AUTOMOBILES.

1,058,575.

Specification of Letters Patent.

Patented Apr. 8, 1913.

Application filed October 26, 1912. Serial No. 727,921.

*To all whom it may concern:*

Be it known that I, JAMES MONROE FLEMING, a citizen of the United States, residing at Pensacola, in the county of Escambia and State of Florida, have invented a new and useful Adjustable Seat-Back for Automobiles; and I do hereby declare the following to be a full, clear, and exact description of the invention, such as will enable others skilled in the art to which it appertains to make and use the same.

This invention relates to a new and useful adjustable seat back.

As one of the objects of the invention, it is the aim to provide a seat back of this nature, adapted for the purpose of converting an automobile body or other vehicle body into a couch or the like, whereby an occupant may retire.

As further stated, another object is the provision of means for enabling the seat back to be detached, and the provision of a seat front, which may be thrown to a horizontal position to constitute a foot rest.

One of the features of the invention is the provision of hook rods or hangers, adapted to engage the teeth of ratchet bars, one upon each side of the vehicle body, for holding the seat back at any angle, or in a plane in alinement with the front and rear seats, so as to convert the body into a couch. When the seat back is disposed in such a plane, a spring arm is put under tension, which arm constitutes means, when pressure is relieved upon the back, to partially throw the back upwardly, so that it may be easily grasped, so it may be disposed vertically.

The invention comprises further features and combination of parts, as hereinafter set forth, shown in the drawings and claimed.

In the drawings:—Figure 1 is a view in elevation and partly in section of an automobile body, showing the improved seat back as applied thereto. Fig. 2 is a central longitudinal sectional view through the body, showing the hangers detached from the rack, and the arm 20 seated in the socket 22. Fig. 3 is a sectional view, showing the seat back thrown in alinement with the front and rear seats. Fig. 4 is a detail view of the seat back. Fig. 5 is a detail view of the seat, showing the socket 22. Fig. 6 is a sectional view on line 6—6 of Fig. 2. Fig. 7 is a detail view of the detachable hinge connections. Fig. 8 is a view showing the seat back 9 adjusted so as to be used as a table.

Referring more particularly to the drawings 1 designates an automobile body, which is substantially of the usual construction, and for illustrative purposes a body is shown, whereby four or more passengers may be carried. This body is provided with the front and rear seats 2 and 3.

Hinged to the front seat 2 as at 4 is a front board 5, which is provided with a pivoted arm 6, which may be thrown in such a manner as to support the front board 5 in a horizontal plane, as shown in Fig. 3.

Hinged at 7 to the rear of the front seat, by means of detachable hinge connections 8, as shown in Fig. 4 is a seat back 9. Connected to the eyes 10 of the seat back are the hangers or hook rods 11, the ends 12 of which terminate in loops 13, which are adapted to engage any two correspondingly opposite teeth 14 of the ratchet bars 15 (which are secured to the sides of the automobile body as at 16) so as to hold the seat back in various adjusted positions; for instance, in a plane in alinement with the front and rear seats, so as to convert the automobile body into a couch. The edge 17 of the seat back 9 has pivoted thereto as at 18 a spring arm 20, the free end 21 of which may be received in a socket 22 of the rear seat, so as to hold the seat back 9 yieldably in position, especially if the loop ends of the hangers are not in engagement with the teeth of the ratchet bars. When the seat back 9 is in alinement with the front and rear seats, the spring arm 20 is under tension, and it will be seen that just so soon as pressure is relieved upon the seat back 9, this arm will tend to raise the portion 23 of the seat back automatically a short distance above the rear seat, so it may be easily grasped, whereby the occupant may adjust the back to a vertical position. The hangers beyond the looped ends terminate in extensions 24, which engage under the ratchet bars, thereby constituting means for preventing the disconnection of said looped ends, that is, accidentally. However, the extensions 24 may be distorted slightly, so that the looped ends may be disconnected from the ratchet bar.

In Fig. 8 the seat back 9 is arranged, in order to be used as a table, the spring arm 20 acting as a leg, while the loops 13 of the hook rods 11 engage correspondingly opposite teeth of the ratchet bars 15. It will be seen that, owing to the detachable hinge connection the seat back 9 may be adjusted or arranged as hereinbefore stated.

The invention having been set forth, what is claimed as new and useful is:—

1. In combination, an automobile body having a front and rear seat, the front seat having a detachably hinged back, while the rear seat is provided with a socket at its front portion, and a spring arm connected to said back, the free end of which is adapted to engage said socket for holding said back yieldably in position.

2. In combination, an automobile body having a front and rear seat, the front seat having a detachably hinged back, while the rear seat is provided with a socket at its front portion, a spring arm connected to said back, the free end of which is adapted to engage said socket for holding said back yieldably in position, said spring arm adapted to be disengaged from said socket so as to engage the floor of the body and placed under tension when the back of the front seat is thrown in alinement with the rear seat, thereby constituting means for throwing said back above the plane of the rear seat so it may be easily grasped, and means for holding said back in different inclined positions.

In testimony whereof I have signed my name to this specification in the presence of two subscribing witnesses.

JAMES MONROE FLEMING.

Witnesses:
 JOHN W. CAWTHON,
 H. E. MELTON.